(12) United States Patent  
Dell et al.

(10) Patent No.: US 8,006,819 B2
(45) Date of Patent: Aug. 30, 2011

(54) OVERRUNNING DECOUPLER WITH LOCKING MECHANISM

(75) Inventors: James W. Dell, Aurora (CA); Hubertus G. Mevissen, Schomberg (CA); John R. Antchak, Innisfil (CA)

(73) Assignee: Litens Automotive Partnership, Woodbridge (CA)

( * ) Notice: Subject to any disclaimer, the term of this patent is extended or adjusted under 35 U.S.C. 154(b) by 827 days.

(21) Appl. No.: 11/993,230

(22) PCT Filed: Jul. 5, 2006

(86) PCT No.: PCT/CA2006/001098
§ 371 (c)(1),
(2), (4) Date: Dec. 20, 2007

(87) PCT Pub. No.: WO2007/003052
PCT Pub. Date: Jan. 11, 2007

(65) Prior Publication Data
US 2010/0101909 A1    Apr. 29, 2010

(51) Int. Cl.
*F16D 41/12* (2006.01)
*F02B 67/06* (2006.01)
*F16F 15/121* (2006.01)

(52) U.S. Cl. ........ 192/42; 192/41 S; 192/46; 192/48.92; 192/84.31; 192/104 C

(58) Field of Classification Search ............. 192/55.5, 192/84.8
See application file for complete search history.

(56) References Cited

U.S. PATENT DOCUMENTS

| 1,984,490 | A | 12/1934 | North |
| 2,427,120 | A | 9/1947 | Blair |
| 2,746,585 | A * | 5/1956 | Binder ............ 192/104 C |
| 2,794,524 | A * | 6/1957 | Sacchini et al. ......... 192/48.6 |
| 5,927,455 | A | 7/1999 | Baker et al. |
| 6,083,130 | A | 7/2000 | Mevissen et al. |
| 6,176,359 | B1 | 1/2001 | Krisher |
| 7,347,309 | B2 * | 3/2008 | Wiesneth et al. ......... 192/104 C |
| 2004/0118654 | A1 | 6/2004 | Robuck |

FOREIGN PATENT DOCUMENTS

| DE | 102 53 495 | 9/2003 |
| EP | 01544435 A1 | 6/2005 |
| WO | WO 03/104673 A1 | 12/2003 |
| WO | WO 2004/065811 A1 | 8/2004 |
| WO | WO 2004/101973 A1 * | 11/2004 |
| WO | WO2005059408 A1 | 6/2005 |
| WO | WO 2006/021254 A1 | 3/2006 |
| WO | WO2007003052 A1 | 1/2007 |

* cited by examiner

*Primary Examiner* — Rodney H Bonck
(74) *Attorney, Agent, or Firm* — Harness, Dickey & Pierce, P.L.C.

(57) ABSTRACT

An overrunning accessory decoupler with a locking mechanism provides the desired overrunning accessory decoupler functionality and also permits torque to be transferred from the accessory to which the decoupler is installed to the drive of the engine when desired. In one embodiment, the decoupler includes a locking mechanism that is controlled by centrifugal forces developed in the decoupler to lock the decoupler to permit the accessory to transfer torque to the drive to start or boost the engine. In another embodiment, the decoupler locking mechanism includes an electromagnet that can be energized to lock and/or unlock the decoupler.

14 Claims, 4 Drawing Sheets

OVERRUNNING DECOUPLER WITH LOCKING MECHANISM

FIELD OF THE INVENTION

The present invention relates to an overrunning decoupler. More specifically, the present invention relates to an overrunning decoupler for a driven pulley on a serpentine belt drive, or the like, which further includes a locking mechanism to permit the pulley to drive the serpentine belt.

BACKGROUND OF THE INVENTION

Overrunning decouplers for serpentine drives and the like on internal combustion engines are well known and operate to reduce torsional vibrations in the serpentine drive which are created by combustion strokes of the engine and intermittent loads on the serpentine belt.

Such decouplers typically include a one way clutch, which operate such that the decoupler only transmits torque in one rotational direction, and an isolation spring which operates between the decoupler pulley and the accessory device driven by the pulley to dampen the torsional vibrations.

Typically, such overrunning accessory decouplers (OAD's) are installed on the alternator of an internal combustion engine, as the alternator has the highest inertial load of the accessories driven by the serpentine drive.

By employing an OAD on a serpentine drive, numerous advantages can be obtained, including increasing the life of the serpentine belt, decreasing the spring force requirements of the belt tensioner for the serpentine system, etc.

Examples of OAD's include published PCT application WO 2004/011818, published PCT application WO 98/50709, U.S. Pat. Nos. 5,156,573 and 6,044,943 amongst several others.

Recently, interest has been expressed in employing an alternator, or generator, as a starter to replace the need for a conventional starter motor or to employ the alternator/generator as a starter assist device, allowing a starter motor to be employed which has a smaller output capacity than would otherwise be required, the smaller starter and the alternator/generator starter assist device operating in combination.

While known OAD's do improve serpentine drives, they do suffer from a disadvantage in that they only transmit torque in one direction, namely from the driving serpentine belt to the accessory, thus preventing their use with alternator/generator starters or starter assist devices.

It is desired to have an OAD that can be used with an alternator/generator starter or starter assist device.

SUMMARY OF THE INVENTION

It is an object of the present invention to provide a novel overrunning accessory decoupler that obviates or mitigates at least one disadvantage of the prior art.

According to a first aspect of the present invention, there is provided an overrunning accessory decoupler, comprising: a pulley to engage a drive of an engine; a hub to engage the drive of an engine accessory; an isolator spring acting between the pulley and the hub to dampen torsional vibrations therebetween; a one way clutch acting between the pulley and the hub to permit torque to be transferred therebetween in a first direction and to inhibit the transfer of torque therebetween in a second, opposite, direction; and a locking mechanism operable in a lock position to lock or couple the pulley to the hub to permit the transfer of torque in the second direction when the decoupler is in a first condition and operable to unlock or uncouple the pulley to inhibit, with the one way clutch, the transfer of torque in the second direction when the decoupler is in a second condition.

The present invention provides a overrunning accessory decoupler which provides the desired overrunning accessory decoupler functionality and which also permits torque to be transferred from the accessory to which the decoupler is installed to the drive of the engine when desired. In one embodiment, the decoupler includes a locking mechanism that is controlled by centrifugal forces developed in the decoupler to lock the decoupler to permit the accessory to transfer torque to the drive to start the engine. In another embodiment, the decoupler includes a locking mechanism with an electromagnet that can be energized to lock the decoupler and de-energized, or energized with a reverse polarity, to open the lock mechanism.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
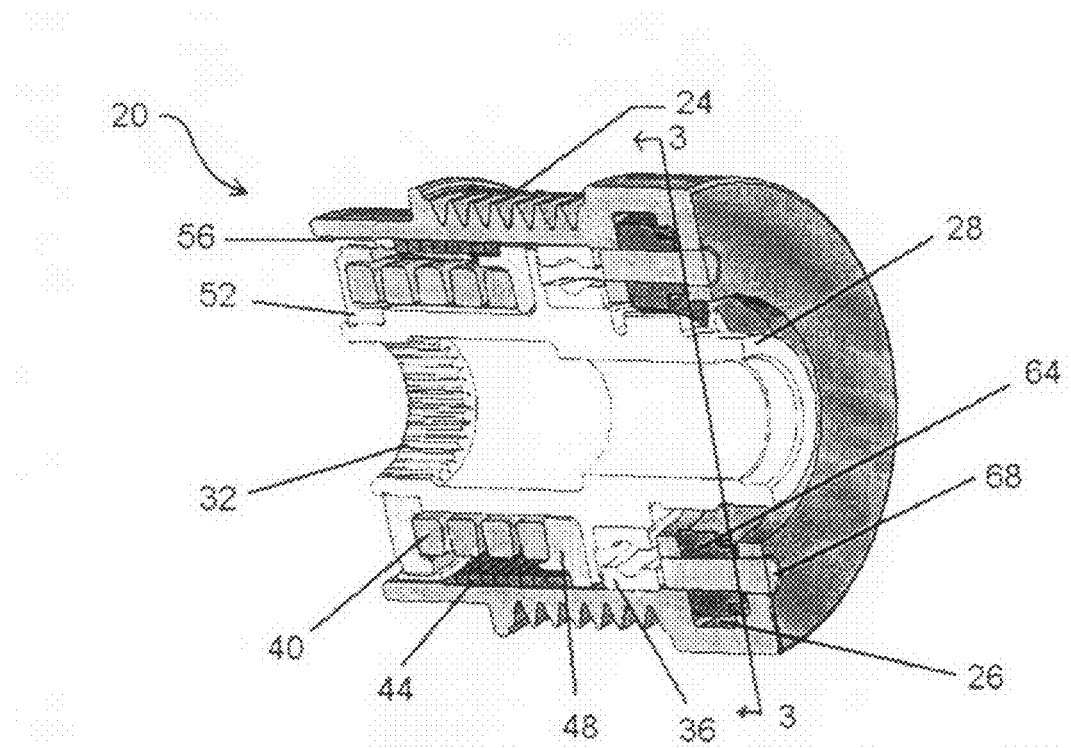
FIG. 1 shows a cross section of an overrunning accessory decoupler in accordance with the present invention.
Figure 3:
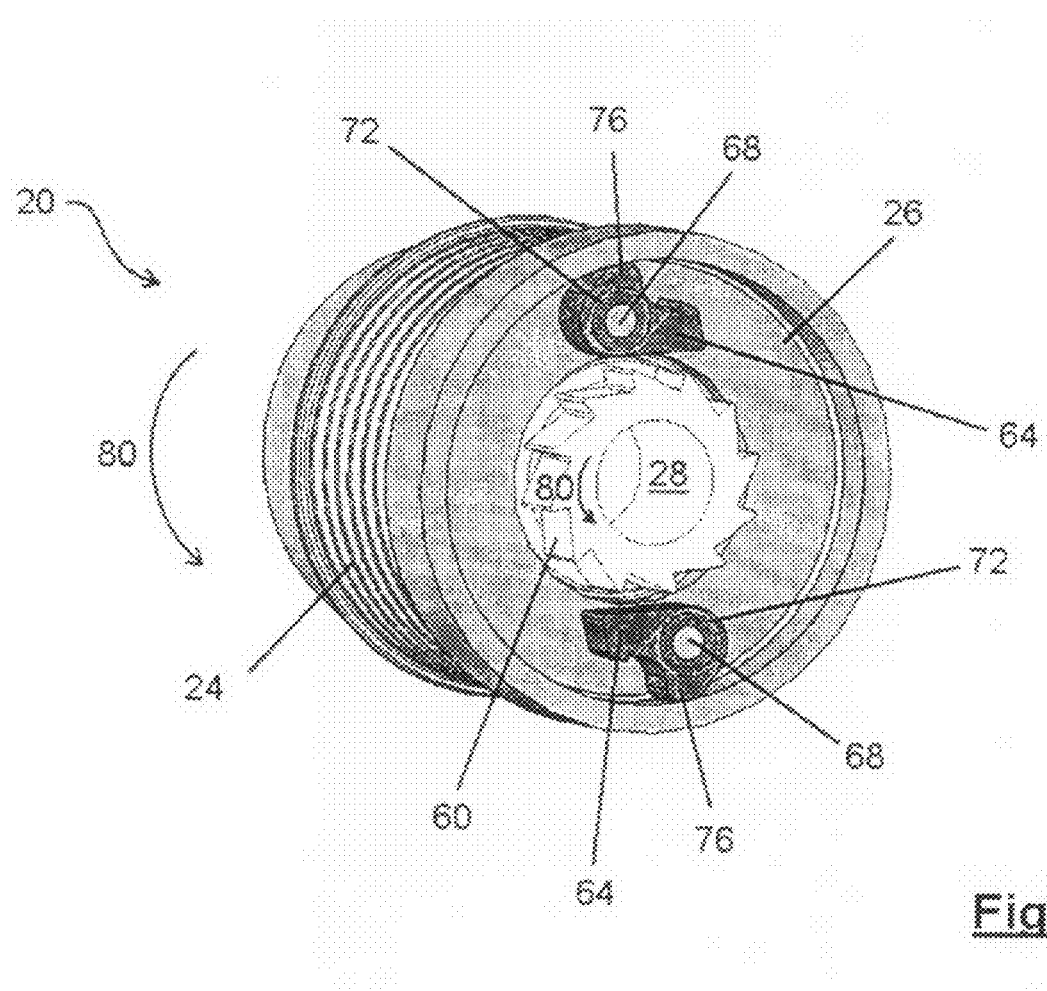
FIG. 3 shows a section, taken along line 3-3 of FIG. 1.

An overrunning accessory decoupler (OAD) in accordance with the present invention is indicated generally at 20 in FIGS. 1 and 3. OAD 20 includes an outer pulley 24 configured to engage a serpentine belt or other drive means, and a hub 28 configured to be mounted on a shaft of an accessory. Pulley 24 is rotatably mounted on the hub 28.

Pulley 24 further includes a locking mechanism recess 26, discussed below and, while in the illustrated embodiment pulley 24 is designed to engage a belt drive, the present invention is not so limited and can be employed with chain drives, in which case the outer surface of pulley 24 will include appropriate sprocket teeth, or gear drives, in which case the outer surface of pulley 24 will include appropriate gear teeth.

In the illustrated embodiment, hub 28 includes internal threads (not shown) which are complementary to the threads on the accessory's drive hub and which can be used to mount OAD 20 to the accessory's drive hub. Hub 28 also preferably includes a interior set of splines 32 which can be used during installation of the OAD 20 to hold hub 28 to allow torquing of the interior threads to the accessory drive hub. However, again, the present invention is not so limited and hub 28 can engage the drive of an accessory in any suitable manner including a keyed hub, a tapered interface, a square inner cross section which is complementary to the outer cross section of the accessory drive hub, etc.

As used herein, the term "accessory" is intended to comprise any device which can be driven by, or which drives, a belt or chain and includes, without limitation, alternators, generators, compressors, vacuum pumps, servos, crankhubs, oil pumps and water pumps.

Pulley 24 rotates on hub 28 via a bearing 36 that is preferably a sealed roller bearing. To provide dampening between pulley 24 and hub 28, an isolation spring 40 is provided and a one way clutch, in the form of clutch spring 44 is also provided to limit the transmission of torque between pulley 24 and hub 28 to one direction only. Isolation spring 40 is mounted between pulley 24 and hub 28 via a spring carrier 48 and a spring retainer 52. Clutch spring 44 is mounted between pulley 24 and hub 28 via carrier 48. A bushing 56 supports the end of hub 28.

The operation of the OAD components and mechanisms described is substantially conventional, however the present invention differs from conventional OADs in that it includes a locking mechanism, described below.

Recently, manufacturers of engines have become interested in replacing, or assisting, the starter motor of internal combustion engines with an alternator or generator which, in addition to creating an electrical output when driven by torque supplied from a serpentine belt or the like, can also be used to provide torque to drive the serpentine belt when the alternator or generator is provided with a suitable electrical input. Depending upon the capacity of the alternator/generator, a dedicated starter motor can be omitted altogether (saving weight, space and/or cost) or can be constructed with a capacity less than would otherwise be required if the alternator/generator was not able to contribute starting torque.

However, to date, such alternator/generator starting systems have not been able to employ OADs as the one way clutch of the OAD prevents the alternator/generator from transmitting torque to the serpentine belt.

Accordingly, the present invention includes a locking function which can selectively lock pulley 24 with respect to hub 28. When OAD 20 is locked, the hub 28 is coupled to the pulley 24 enabling torque to be transmitted in either direction between the accessory on which OAD 20 is installed and the serpentine belt and when OAD 20 is unlocked by the locking mechanism, all of the isolation and overrunning operations of OAD 20 are available.

Figure 2:
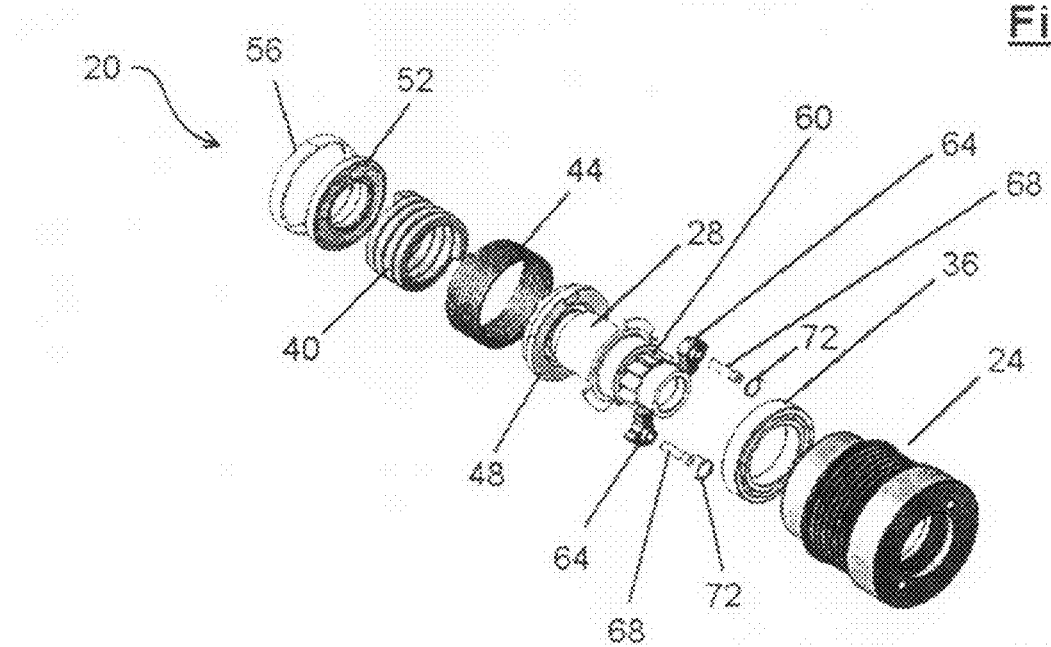
FIG. 2 shows an exploded view of the overrunning accessory decoupler of FIG. 1.

In the embodiment illustrated in FIGS. 1 through 3, OAD 20 includes a centrifugal locking mechanism. Specifically, as best seen in FIG. 3, hub 28 includes a set of teeth 60 which are located in locking recess 26 of pulley 24 when OAD 20 is assembled. At least one pawl 64, and in the illustrated embodiment two pawls 64 are employed, is mounted adjacent teeth 60 in annular recess 26 via a pivot pin 68 mounted through a face of pulley 24. Preferably, the pawls 64 are circumferentially spaced in a rotationally balanced configuration.

Each pawl 64 can pivot about respective pin 68, defining a center of rotation. Each pawl 64 has a generally L-shape configuration with the center of mass spaced from the center of rotation. Each pawl pivots between a lock position, wherein the pawl engages one of teeth 60 to lock and couple movement of hub 28 with respect to pulley 24, and an unlock position wherein pawl 64 is disengaged from teeth 60 and pulley 24 is uncoupled from the hub 28, permitting conventional OAD operation of OAD 20.

Each pawl 64 has a pawl spring 72 mounted to it, which acts against pulley 24 to bias pawl 64 to the lock position. Each pawl 64 further includes a specific profile 76, preferably integrally formed with pawl 64, profile 76 abutting the inner periphery of recess 26, as shown in FIG. 3, when pawl 64 is in the open position to prevent further opening of pawl 64.

The teeth 60 and the pawls 64 are configured to provide a driving connection between the pulley 24 and the hub 28 in only a first direction of rotation indicated by arrow 80. The pawls 64 cannot engage the teeth 60 to inhibit rotation in a second direction, in a sense opposite the first rotational direction.

As should now be apparent to those of skill in the art, when OAD 20 is at rest, such as when the engine it is installed on is stopped, pawl springs 72 bias pawls 64 into engagement with teeth 60, effectively locking pulley 24 to hub 28 to permit torque from the accessory to which OAD 20 is installed to be applied, in the direction, to the belt, chain or gear driven by pulley 24. This allows the accessory to which OAD 20 is installed, to be used to apply a starting torque to the engine through the belt, chain or spring.

Once the engine has started, it is desired that OAD 20 provide the conventional and desired isolation and overrunning functions of an OAD. Accordingly, the spring force of pawl springs 72, the center of mass of pawl 64 with respect to center of rotation at pin 68 and the radial position of pin 68, with respect to the center line of pulley 24, are selected such that pawls 64 will rotate to the position shown in FIG. 3, under the developed centrifugal force after overcoming the bias of the pawl springs 72. The point at which the pawls 64 overcome the bias can be preselected.

For example, pawls 64 and springs 72 can be designed and/or selected such that pawls 64 are in the lock position, locking pulley 24 to hub 28, at rotational speeds for pulley 24 of between 0 and 900 RPM and pawls 64 move to the open position at rotational speeds for pulley 24 above 900 RPM.

Assuming the mechanical advantage (pulley ratios) between pulley 24 and the crankhub of the engine are 3:1, this means that at engine operating speeds above 300 RPM (well below any expected operating speed of the engine when running) OAD 20 will operate conventionally and during speeds below 300 RPM, i.e.—during starting, the locking mechanism of OAD 20 will be engaged to allow the alternator/generator or other accessory to which OAD is installed to act as, or to assist, an engine starter.

Figure 4:
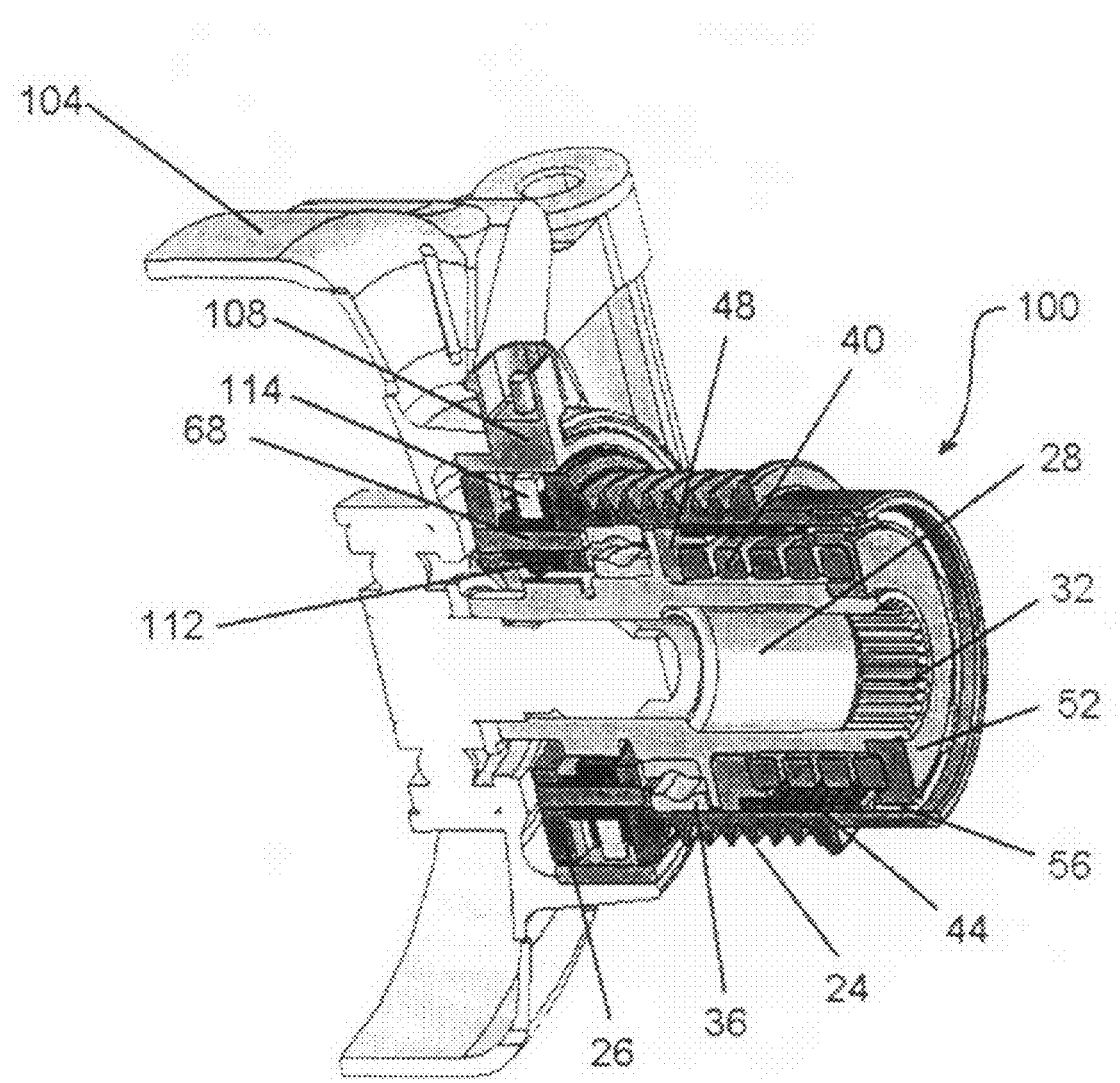
FIG. 4 shows a cross section of another embodiment of an overrunning accessory decoupler in accordance with the present invention.
Figure 5:
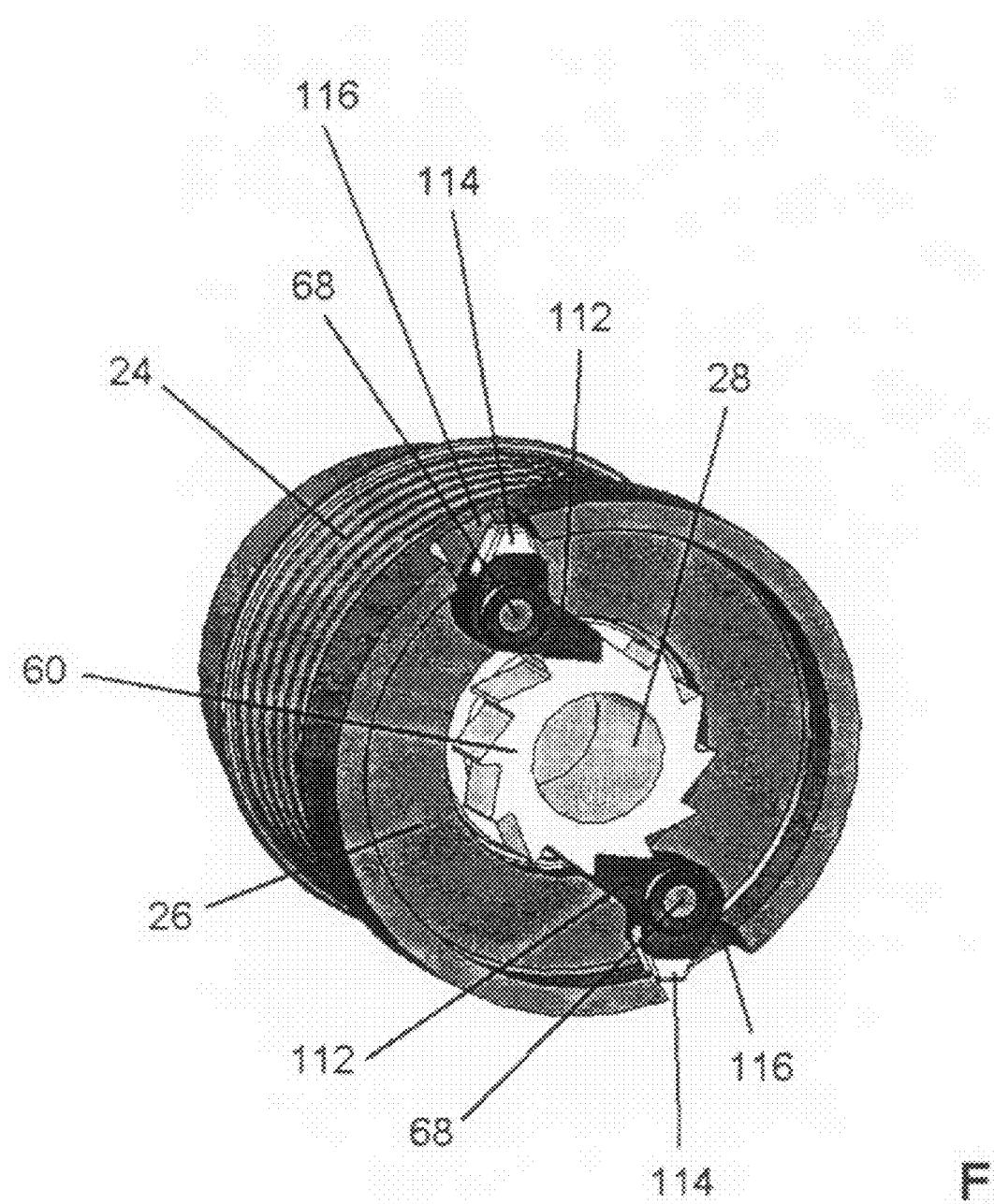
FIG. 5 is a section showing the pawls of the locking mechanism of the embodiment of FIG. 4.

Another embodiment of the present invention is illustrated in FIGS. 4 and 5 wherein an OAD in accordance with the present invention is indicated generally at 100 installed on an accessory 104 that, in this example, is a generator/starter. In the illustrated embodiment, wherein like components to those of OAD 20 are indicated with like reference numerals, OAD 100 further includes an electromagnet 108, which can be a component mounted to accessory 104 or can be integrally formed therein, located adjacent and surrounding lock recess 26.

In this embodiment the pawls 112 are L-shaped with the longer section engaging teeth 60 and the shorter arm containing a permanent magnet 114. If pulley 24 is formed of a magnetic material, then pulley 24 preferably includes apertures 116 directly above permanent magnets 114 in pawls 112 to substantially eliminate any magnetic force, from magnetic attraction between permanent magnets 114 and the outer periphery of locking recess 26, being exerted on pawls 112 to rotate them about pins 68 and to allow magnetic force from electromagnet 108, when energized, to act on permanent magnets 114 to rotate, pawls 112. If pulley 24 is fabricated from a non-magnetic material, such as aluminum or plastic, apertures 116 need not be provided.

When electromagnet 108 is energized, as required, by the ECU or other control system of the vehicle, the magnetic field it produces attracts permanent magnets 114 of pawls 112 and causes pawls 112 to rotate about pins 68 into engagement with teeth 60. This locks pulley 24 to hub 28 and permits torque to be transmitted from the generator/starter to pulley 24 to drive the accessory drive belt.

Once it is desired to unlock pulley 24 from hub 28, such as when the engine starts, the current supplied to electromagnet 108 is reversed, thus reversing the magnetic forces exerted on permanent magnets 114, to rotate pawls 112 to disengage from teeth 60, unlocking or uncoupling pulley 24 from hub 28. Alternatively, pawls 112 can be designed such that the centrifugal forces, developed as pulley 24 rotates, will move pawls 112 to the unlocked position when electromagnet 108 is de-energized or springs, similar to pawl springs 72 but operating to bias pawls 112 to an open position, can be employed to return pawls 112 to a position wherein they are disengaged from teeth 60.

While the design of FIGS. 4 and 5 is presently preferred for magnetically controlled embodiments of the present invention, the present invention is not limited to the use of pawls which are magnetically moved between locked and unlocked positions. Instead, as will be apparent to those of skill in the art, a variety of electric and/or electromagnetic mechanisms can be employed to lock and unlock pulley 24 to hub 28. Examples of other suitable contemplated mechanisms include electromagnetic clutches, such as those commonly employed with automotive air conditioner compressors or automotive superchargers and manufactured by companies skilled in the art such as Warner Electric, Denso, Ogura Industrial Corporation, Delphi Electronics, Bosch, Denso, Sanden, and Aisin Seiki.

A contemplated advantage of OAD 100 over OAD 20 is that OAD 100 can be selectively placed into a locked condition even when the engine is operating, by energizing electromagnet 108. It is contemplated that this will allow accessory 104 to intermittently provide "boost" torque via locked OAD 100 when the engine is under high load conditions.

The above-described embodiments of the invention are intended to be examples of the present invention and alterations and modifications may be effected thereto, by those of skill in the art, without departing from the scope of the invention which is defined solely by the claims appended hereto.

We claim:

1. An overrunning accessory decoupler, comprising:
   a hub configured to be mounted on a shaft;
   a pulley rotatably mounted on said hub;
   an isolator spring acting between the pulley and the hub to dampen torsional vibrations therebetween;
   a one-way clutch acting between the pulley and the hub to permit torque to be transferred therebetween in a first rotational sense and to inhibit the transfer of torque therebetween in a second rotational sense, opposite said first sense; and
   a locking mechanism movable between a lock position and an unlock position and operable to couple and uncouple the pulley to the hub to selectively permit the transfer of torque in the second rotational sense;
   wherein the locking mechanism does not lock the hub to the pulley in the first rotational sense
   wherein the locking mechanism is biased to the lock position and is moved to the unlock position by centrifugal force overcoming the bias, the centrifugal force being developed by rotation of the pulley.

2. The overrunning accessory decoupler of claim 1 wherein said locking mechanism comprises a series of teeth on said hub and at least one pawl pivotally mounted on said pulley and configured to engage said series of teeth in said second rotational sense.

3. The overrunning accessory decoupler of claim 2 wherein the locking mechanism is operable to move between the lock position and the unlock position at a preselected rotational speed.

4. The overrunning accessory decoupler of claim 3 wherein said at least one pawl is L-shaped having a center of mass spaced from a center of rotation enabling said at least one pawl to pivot out of engagement with said series of teeth as a function of rotational speed of said pulley.

5. The overrunning accessory decoupler of claim 4, wherein pulley has an annular recess receiving said at least one pawl.

6. The overrunning accessory decoupler of claim 5, wherein the locking mechanism is biased to the lock position by a spring.

7. The overrunning accessory decoupler of claim 5 wherein the locking mechanism is biased to the lock position by energizing an electromagnet with a current of a first polarity and is moved to the open position by energizing the electromagnet with a current of a second polarity opposite said first polarity.

8. The overrunning accessory decoupler of claim 7, wherein said at least one pawl has a permanent magnet.

9. The overrunning accessory drive decoupler of claim 5, wherein said preselected rotational speed is less than 900 RPM.

10. The overrunning accessory drive decoupler of claim 5, wherein said preselected rotational speed is less than 300 RPM.

11. The overrunning accessory decoupler of claim 5 wherein the pulley is configured to engage a belt, a chain or a gear.

12. The overrunning accessory decoupler of claim 1 wherein the locking mechanism is biased to the lock position by energizing an electromagnet and is moved to the unlock position by centrifugal force developed by rotation of the pulley when the electromagnet is de-energized.

13. An overrunning accessory decoupler, comprising:
   a hub configured to be mounted on a shaft;
   a pulley rotatably mounted on said hub;
   an isolator spring acting between the pulley and the hub to dampen torsional vibrations therebetween;
   a one-way clutch acting between the pulley and the hub to permit torque to be transferred therebetween in a first rotational sense and to inhibit the transfer of torque therebetween in a second rotational sense, opposite said first sense; and
   a locking mechanism movable between a lock position and an unlock position and operable to couple and uncouple the pulley to the hub to selectively permit the transfer of torque in the second rotational sense;
   wherein the locking mechanism is biased to the lock position and is moved to the unlock position by centrifugal force overcoming the bias, the centrifugal force being developed by rotation of the pulley;
   wherein said locking mechanism comprises a series of teeth on said hub and at least one pawl pivotally mounted on said pulley and configured to engage said series of teeth in said second rotational sense;
   wherein the locking mechanism is operable to move between the lock position and the unlock position at a preselected rotational speed;
   wherein said at least one pawl is L-shaped having a center of mass spaced from a center of rotation enabling said at least one pawl to pivot out of engagement with said series of teeth as a function of rotational speed of said pulley;
   wherein pulley has an annular recess receiving said at least one pawl; and
   wherein the locking mechanism is biased to the lock position by energizing an electromagnet and is moved to the unlock position by centrifugal force developed by rotation of the pulley when the electromagnet is de-energized.

14. The overrunning accessory decoupler of claim 13, wherein said at least one pawl has a permanent magnet.

* * * * *